(12) United States Patent
Wang et al.

(10) Patent No.: US 10,093,780 B2
(45) Date of Patent: Oct. 9, 2018

(54) SHRINK FILM FROM SINGLE SITE CATALYZED POLYETHYLENE

(71) Applicant: NOVA Chemicals (International) S.A., Fribourg (CH)

(72) Inventors: XiaoChuan Wang, Calgary (CA); Peter Zoricak, Calgary (CA); Norman Dorien Joseph Aubee, Okotoks (CA); Stephen John Brown, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 461 days.

(21) Appl. No.: 14/859,395

(22) Filed: Sep. 21, 2015

(65) Prior Publication Data

US 2016/0083539 A1    Mar. 24, 2016

(30) Foreign Application Priority Data

Sep. 22, 2014 (CA) .................................. 2864573

(51) Int. Cl.
| | |
|---|---|
| B32B 27/08 | (2006.01) |
| C08J 5/18 | (2006.01) |
| B32B 27/32 | (2006.01) |
| C08L 23/08 | (2006.01) |
| B32B 27/30 | (2006.01) |

(52) U.S. Cl.
CPC .............. C08J 5/18 (2013.01); B32B 27/08 (2013.01); B32B 27/306 (2013.01); B32B 27/32 (2013.01); B32B 27/327 (2013.01); C08L 23/0815 (2013.01); B32B 2250/24 (2013.01); B32B 2270/00 (2013.01); B32B 2307/40 (2013.01); B32B 2307/50 (2013.01); B32B 2307/518 (2013.01); B32B 2307/54 (2013.01); B32B 2307/558 (2013.01); B32B 2307/72 (2013.01); B32B 2307/736 (2013.01); B32B 2439/00 (2013.01); B32B 2439/70 (2013.01); B32B 2553/00 (2013.01); C08J 2323/08 (2013.01); C08J 2423/08 (2013.01); C08L 2203/16 (2013.01); C08L 2205/025 (2013.01); C08L 2314/06 (2013.01)

(58) Field of Classification Search
CPC combination set(s) only.
See application file for complete search history.

(56) References Cited

U.S. PATENT DOCUMENTS

| | | | |
|---|---|---|---|
| 5,047,475 A | 9/1991 | Ogawa et al. | |
| 5,064,802 A | 11/1991 | Stevens et al. | |
| 5,132,380 A | 7/1992 | Stevens et al. | |
| 5,198,401 A | 3/1993 | Turner et al. | |
| 5,376,439 A | 12/1994 | Hodgson et al. | |
| 5,527,752 A | 6/1996 | Reichle et al. | |
| 5,589,555 A | 12/1996 | Zboril et al. | |
| 5,591,390 A | 1/1997 | Walton et al. | |
| 5,595,705 A | 1/1997 | Walton et al. | |
| 5,637,660 A | 6/1997 | Nagy et al. | |
| 5,851,945 A | 12/1998 | Turner et al. | |
| 5,852,145 A | 12/1998 | McLain et al. | |
| 6,024,483 A | 2/2000 | Burke et al. | |
| 6,720,396 B2 | 4/2004 | Bell et al. | |
| 7,737,220 B2* | 6/2010 | Swabey | C08L 23/06 525/192 |
| 2010/0203311 A1* | 8/2010 | Michie, Jr. | C08J 5/18 428/220 |
| 2013/0029125 A1* | 1/2013 | Tse | C08J 5/18 428/220 |

FOREIGN PATENT DOCUMENTS

WO      93/03093 A1    2/1993

OTHER PUBLICATIONS

ASTM D 6645-01; Standard Test MEthod for Methyl (Comonomer) Content in Polyethylene by Infrared Spectrophotometryl; ASTM International, pp. 1-4.
ASTM D 1922-03a; Standard Test Method for Propagation Tear REsistance of Plastic Film and Thin Sheeting by Pendulum Method1; ASTM International, pp. 1-6.
ASTM D 882-10; Standard Test Method for Tensile Properties of Thin Plastic Sheeting1; ASTM International, pp. 1-10.
ASTM D 792-13; STandard Test Methods for Density and Specific Gravity (Relative Density) of Plastics by Displacement1; pp. 1-6.

* cited by examiner

Primary Examiner — Robert T Butcher
(74) Attorney, Agent, or Firm — Lawrence T. Kale

(57) ABSTRACT

Shrink film having a desirable balance of properties is manufactured from a polyethylene blend composition having a fractional melt index and a molecular weight distribution of from about 2.5 to about 7. The blend composition comprises a first blend component that is made with a single site catalyst and has a molecular weight of greater than about 140,000 and a first density, $d_1$. The blend composition also contains a second blend component having a lower molecular weight and a second density, $d_2$, that is greater than the density of $d_1$ in an amount of from about 0.018 to about 0.032 g/cc. The films of this disclosure may be used, for example, as an overwrap or pallet wrap to protect goods during shipping and in food packaging applications (such as shrink wrap for frozen poultry).

8 Claims, No Drawings

SHRINK FILM FROM SINGLE SITE CATALYZED POLYETHYLENE

FIELD OF THE DISCLOSURE

This disclosure relates to shrink films made from a fractional melt index polyethylene prepared with a single site catalyst.

BACKGROUND OF DISCLOSURE

The term "shrink film" refers to a plastic wrapping film which has the characteristic of shrinking when it is heated to near the melting point of the film. These films are commonly manufactured from plastic resins such as polyvinyl chloride (PVC); polypropylene (PP); linear-low density polyethylene (LLDPE); low density polyethylene (LDPE); high density polyethylene (HDPE); copolymers of ethylene and vinyl acetate (EVA); copolymers of ethylene and vinyl alcohols (EVOH); ionomers (e.g. Surlyn™); copolymers of vinylidene chloride (e.g. PVDC, SARAN™ copolymers of ethylene acrylic acid (EAA); polyamides (PA); among others.

End uses of these films include food packaging (for example, oxygen and moisture barrier bag for frozen poultry, primal meat cuts and processed meat and cheese products for preservation of freshness and hygienics) and non-food packaging (for example, "overwraps" for protecting goods against damage, soiling, tampering and pilferage) during transportation, distribution, handling and display. An example of end use is found in retail sales where the films are wrapped air-tight around single or multiple items of compact disks, audio/video tapes, computer software boxes, magazines, confectionery, boxed products, single serve bowls, etc. Another example of end use is found in wholesale retailing where multiple containers of bottled and canned goods such as beverages, condiments and personal hygiene products are sold in bulk. Yet another example is found in courier shipping where single items of shrink-wrapped sporting goods and household appliances are now safely transported without the need for bulky protective cardboard cartons.

Collation shrink films are a particular type of shrink film. Collation shrink films are films that are wrapped around many packaging units (such as bottles or cans) and shrunk to keep the units within the package together. For example, collation shrink film may be wrapped around a multi-pack of drinks that are placed on a cardboard base and the film is then shrunk around the containers. The wrapping process typically involves a shrink oven or shrink tunnel in which the film is heated to cause the collation shrink wrapping to occur. The shrinking of the plastic film causes it to collapse around the multiple containers and hold them in place.

Collation films generally fall into two main categories, namely "transportation" (or shipping) films and "display" films.

Transportation film is typically used for bringing goods from the manufacturer to the retailer. The film is usually removed by the retailer and the products stacked on a shelf for sale. In the case of cans or bottles, a cardboard tray is usually placed below and the film acts as a tray overwrap. This type of shrink film provides cost savings in comparison to the use of cardboard boxes. The key attributes of transportation collation shrink films are toughness, good holding force and abuse resistance. The film appearance is of less concern and hence optical properties are less important in this application. "Display" collation film is generally used as secondary packaging in which the product is displayed for sale at the retailer and the customer takes home the product with the film. Examples include bottled water and beverages that is wrapped. Hence optical properties are more important in this sub-application.

Thus, the desired properties of collation shrink films (monolayer or multilayer) include 1) good shrinkage and holding force, 2) good stiffness, 3) good puncture resistance or toughness; 4) good optical properties and 5) good tensile strength at break. Some shrink films are made from "homogeneously branched" or "homogenous" resins.

Homogeneous resins may be prepared with so-called single site catalysts (e.g. metallocene catalysts) which are well known and widely described in the literature.

"Homogeneous" resin compositions have a uniform composition i.e. most of the polymer components of the composition have the same (or similar) comonomer content or density. These homogeneous resins typically exhibit excellent organoleptic properties and impact strength properties.

U.S. Pat. No. 6,306,969 describes a shrink film comprising a polymer composition characterized as having a density in the range of 0.88 gram/centimeter (g/cc) to 0.94 g/cc. The composition has two components which may be of different density but the density difference is small (from 0 to 0.018 g/cc).

U.S. Pat. Nos. 5,591,390 and 5,595,705 describe the preparation of shrink films made with a sub group of homogeneous resins, namely homogeneous resins having long chain branching. However, such resins are comparatively expensive.

More recently, another type of homogenous resin having long chain branching has found use in shrink film applications. This new resin, which is sold under the trade mark ENABLE by ExxonMobil Chemicals is believed to contain long chain branching and is recommended for use in the preparation of shrink films.

SUMMARY OF THE DISCLOSURE

In one embodiment of this disclosure a shrink film is prepared from a polyethylene blend composition having a density of from about 0.920 to about 0.950 g/cc and a melt index, $I_2$, of from about 0.1 to about 0.9 grams per 10 minutes, and a molecular weight distribution Mw/Mn, of from about 2.5 to about 7; wherein said polyethylene blend composition comprises 1) from about 30 to about 50 weight % of a first polyethylene composition having a first weight average molecular weight, $Mw_1$, of greater than about 140,000, a first molecular weight distribution, $Mw_1/Mn_1$, of from about 1.7 to about 3, and a first density $d_1$;

2) from about 70 to about 50 weight % of a second polyethylene composition having a second weight average molecular weight, $Mw_2$, that is greater than about 24,000 and less than said first average molecular weight $Mw_1$; a second molecular weight distribution, $Mw_2/Mn_2$, of from about 1.7 to about 3 and a second density $d_2$; with the provisos that 1) $d_2$ is greater than $d_1$, and 2) $d_2-d_1$, is from about 0.018 g/cc to about 0.032 g/cc.

Another embodiment of this disclosure provides an improved method to prepare a shrink film, said method comprising the blown film extrusion of a polyethylene blend composition comprising:

1) from about 30 to about 50 weight % of a first polyethylene composition having a first weight average molecular weight, $Mw_1$, of greater than about 140,000, a first molecular weight distribution, $Mw_1/Mn_1$, of from about 1.7 to about 3, and a first density $d_1$;

2) from about 70 to about 50 weight % of a second polyethylene composition having a second weight average molecular weight, $Mw_2$, that is greater than about 24,000 and less than said first average molecular weight $Mw_1$; a second molecular weight distribution, $Mw_2/Mn_2$, of from about 1.7 to about 3 and a second density $d_2$; with the provisos that 1) $d_2$ is greater than $d_1$, and 2) $d_2-d_1$, is from about 0.018 g/cc to about 0.032 g/cc.

In another embodiment, the $Mw_1$ of the first polyethylene composition is from about 140,000 to about 400,000 and the $Mw_2$ of the second polyethylene composition is from about 25,000 to about 125,000.

In yet another embodiment, the blown film is biaxially oriented to increase the shrink performance of the film.

In yet another embodiment, the first polyethylene composition is prepared with a single site catalyst system.

In yet another embodiment, the polyethylene blend composition is further characterized in that said first polyethylene composition has a first z-average molecular weight, $Mz_1$, of greater than about 250,000, in other cases from about 250,000 to about 450,000. In a further embodiment, the polyethylene blend composition has an overall molecular weight distribution Mw/Mn, of from about 3 to about 5.5 and a density of from about 0.923 to about 0.535 and a melt index, $I_2$, of from about 0.4 to about 0.8 grams/10 minutes.

In yet another embodiment, the shrink film is prepared with a blend that contains from about 20 to about 70 weight % of high pressure low density polyethylene (LDPE) and the above described polyethylene blend composition.

Shrink films must have excellent strength properties and puncture resistance in addition to the obvious need for shrink characteristics to conform to the shape of the packaged goods and to provide attractive shelf appearance.

It is well known to "crosslink" the films (for example, by irradiation) and/or to prepare multilayer shrink films in order to improve these "strength" and "puncture" properties as well as to improve barrier properties. The films of the present disclosure have excellent strength and puncture properties in the form of an uncrosslinked, monolayer film. However, it is also within the scope of the disclosure to further improve the films of the present disclosure via crosslinking and/or "multi-layering" techniques.

Multilayer films are most commonly prepared by coextrusion (as opposed to lamination). Such films are available in constructions of from two to eleven layers. Films having between three and nine layers are typical. The films of the present disclosure may be used as the "core layer(s)" (i.e. one or more of the non-surface layers) of a multilayer construction.

It is also within the scope of the present disclosure to prepare a multilayer film having at least one layer of film according to the present disclosure (a "shrink layer") and one or more layers prepared from completely different plastic resins (such as LDPE, polypropylene (PP) or ethylene-vinyl acetate (EVA).

Shrink film is typically prepared by a blown film extrusion process (as opposed to a "cast" film process). The blown film process is well known to those skilled in the art.

DETAILED DESCRIPTION

Part A Preparation of Polyethylene Blend Composition

The polyethylene blend compositions of this disclosure are may be prepared using a single site polymerization catalyst and at least one solution polymerization reactor. In one embodiment of this disclosure a "dual reactor" polymerization process is used to broaden the molecular weight distribution ("MWD") of the blend compositions.

A. Description of Single Site Catalyst

The term "single site catalyst" as used herein is meant to convey its conventional meaning, namely, a catalyst that produces a polyethylene having a narrow molecular weight distribution and (in the case of copolymers), a uniform comonomer distribution.

In one embodiment, the first blend component of the polyethylene blend composition is prepared with a single site catalyst.

The overall blend composition may be prepared using a dual reactor polymerization system in which two reactors are connected in series. The first blend component (prepared with the single site catalyst) is prepared in the first reactor. The polymer that is prepared in the first reactor flows into the second reactor and further polymer is prepared in the second reactor in the presence of the polymer from the first reactor. The catalyst used in the second reactor may also be a single site catalyst or, alternatively, a Ziegler Natta catalyst.

A description of the single site catalyst follows.

In general, any transition metal catalyst compound which is activated by an aluminum alkyl or methyl aluminoxane (MAO), or an "ionic activator" (discussed in Part C, below) is potentially suitable for use as the single site catalyst. An extensive discussion of such catalysts is provided in U.S. Pat. No. 6,720,396 (Bell et al.; assigned to Univation Technologies) and the references cited therein (disclosure to all of which is incorporated herein by reference). A general (non-limiting) overview of such catalyst compounds follows. Such catalysts typically contain a "bulky" functional ligand. Preferred catalyst compounds are group 4 metal complexes (Ti, Zr, Hf and Rf) which contain one cyclopentadienyl ligand ("homocyclopentadienyl complexes") or two cyclopentadienyl ligands ("biscyclopentadienyl complexes").

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements; for example, atoms selected from carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structures such as a pentadiene, a cyclooctatetraendiyl or an imide ligand. The metal atom may be selected from Groups 3 through 15 or the lanthanide or actinide series of the Periodic Table of Elements. In some cases the metal is a transition metal selected from Groups 4 through 12; in other cases selected from Groups 4, 5 and 6, and; in still other cases the transition metal is selected from Group 4.

In one embodiment, catalyst compounds are represented by the formula:

       (I)

where M is a metal atom from the Periodic Table of the Elements and may be a Group 3 to 12 metal or from the lanthanide or actinide series of the Periodic Table of Elements, in other cases M is a Group 4, 5 or 6 transition metal and in still other cases M is zirconium, hafnium or titanium. The bulky ligands, LA and LB, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In one embodiment, LA and LB may be any other ligand structure capable of η-bonding to M; for example, $\eta^3$-bonding to M or $\eta^5$-bonding. In another embodiment, LA and LB may comprise one or more heteroatoms, for example, nitrogen, silicon, boron, germanium, sulfur and phosphorous, in combination with carbon atoms to form an open, acyclic, or a fused, ring or ring system, for example, a hetero-cyclopentadienyl ancillary ligand. Other LA and LB bulky ligands include but are not limited to bulky amides, phosphides, alkoxides, aryloxides, phosphinimides, imides, carbolides, borollides, porphyrins, phthalocyanines, corrins and other polyazomacrocycles. Independently, each LA and LB may be the same or different type of bulky ligand that is bonded to M. In one embodiment of formula (I) only one of either LA or LB is present.

Independently, each LA and LB may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In some embodiments, substituent groups R have up to 50 non-hydrogen atoms, in other embodiments from 1 to 30 carbon atoms that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted heteroatom radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. As used herein the term "leaving group" is any ligand that can be abstracted from a bulky ligand catalyst compound to form a bulky ligand catalyst species capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, triflurom-ethyl, tetramethylene, pentamethylene, methylidene, methyoxy, ethyoxy, propoxy, phenoxy, bis(N-methyl-anilide), dimethylamide, dimethylphosphide radicals and the like.

In another embodiment, the catalyst compound is represented by the following formula:

LAALBMQn (II)

These compounds represented by formula (II) are known as bridged, ligand catalyst compounds. LA, LB, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'2C, R'2Si, R'2Si, R'2Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, substituted chalcogen, or halogen or two or more R' may be joined to form a ring or ring system. In one embodiment, the bridged, ligand catalyst compounds of formula (II) have two or more bridging groups A.

In one embodiment, the catalyst compounds are those where the R substituents on the bulky ligands LA and LB of formulas (I) and (II) are substituted with the same or different number of substituents on each of the bulky ligands. In another embodiment, the bulky ligands LA and LB of formulas (I) and (II) are different from each other.

In one embodiment, catalyst compounds useful in the present disclosure include bridged heteroatom, mono-bulky ligand compounds. More specifically, these catalysts are group 4 metal (e.g. titanium) complexes characterized by having a bridged, bidentate cyclopentadienyl-amine ligand, as disclosed in the aforementioned U.S. Pat. No. 5,057,475. Preferred bridging groups are dialkyl silyls—especially dimethyl silyl. The amine portion of the ligand preferably has an alkyl substituent on the nitrogen atom (especially tertiary butyl) with the remaining nitrogen bonds bonding to the transition metal and the silicon atom of the dimethyl silyl bridging group. The cyclopentadienyl ligand is pi-bonded to the transition metal and covalently bonded to the bridging group. In some cases the cyclopentadienyl group is substituted, e.g. tetra methyl cyclopentadienyl.

Suitable catalyst compounds include dimethylsilyltetramnethyl cyclopentadienyl-tertiary butyl amido titanium dichloride (and the alkyl analogues—i.e. with the two chloride ligands being replaced by simple alkyls, e.g. methyl) and the catalyst compounds illustrated in the present examples. U.S. Pat. Nos. 5,057,475 and 5,064,802 (are also illustrated in the present Examples).

In another embodiment, the catalyst compound is represented by the formula:

$$LCAJMQn \quad (III)$$

where M is a Group 3 to 16 metal atom or a metal selected from the Group of actinides and lanthanides of the Periodic Table of Elements, in some cases M is a Group 4 to 12 transition metal, and in other cases M is a Group 4, 5 or 6 transition metal, and in still other cases M is a Group 4 transition metal in any oxidation state, especially titanium; LC is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, LC, A and J may form a fused ring system. In an embodiment, LC of formula (III) is as defined above for LA in formula (I) and A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, catalyst compound is a complex of a metal, preferably a transition metal, a bulky ligand, preferably a substituted or unsubstituted pi-bonded ligand, and one or more heteroallyl moieties, such as those described in U.S. Pat. No. 5,527,752.

In another embodiment, the catalyst compounds are represented by the formula:

$$LDMQ2(YZ)Xn \quad (IV)$$

where M is a Group 3 to 16 metal, in some cases a Group 4 to 12 transition metal, and in other cases a Group 4, 5 or 6 transition metal; LD is a bulky ligand that is bonded to M; each Q is independently bonded to M and Q2(YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR2- and —S—. Y is either C or S. Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; in some cases X is a carbamate, carboxylate, or other heteroallyl moiety described by the Q, Y and Z combination.

In another embodiment of the present disclosure, the catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand catalyst compounds are described in U.S. Pat. No. 5,637,660.

In one embodiment, the catalyst compounds are represented by the formula:

$$((Z)XAt(YJ))qMQn \quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, e.g., 2 to 30 carbon atoms; Z is bonded to X, where Z comprises 1 to 50 non-hydrogen atoms, e.g. 1 to 50 carbon atoms, in some cases Z is a cyclic group containing 3 to 50 atoms, e.g. 3 to 30 carbon atoms; t is 0 or 1; when t is 1, A is a bridging group joined to at least one of X, Y or J, in other cases A joined to X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this disclosure, that the catalyst compounds include complexes of Ni2+ and Pd2+ described in U.S. Pat. No. 5,852,145. These complexes can be either dialkyl ether adducts, or alkylated reaction products of the described dihalide complexes that can be activated to a cationic state by the activators or cocatalysts are described below.

Also included as catalyst compounds are those diimine based ligands of Group 8 to 10 metal compounds.

Other suitable catalyst compounds are those Group 5 and 6 metal imido complexes described in U.S. Pat. No. 5,851,945, which is incorporated herein by reference. In addition, bulky ligand catalyst compounds include bridged bis(arylamido) Group 4 compounds, bridged bis(amido) catalyst compounds and catalysts having bis(hydroxy aromatic nitrogen ligands).

It is also contemplated that in one embodiment, the catalyst compounds of this disclosure described above include their structural or optical or enantiomeric isomers (meso and racemic isomers) and mixtures thereof.

Other catalyst compounds useful in this disclosure are disclosed in the aforementioned U.S. Pat. No. 6,720,396 (and references therein), reference to all of which is incorporated herein.

Suitable catalyst compounds for use in this disclosure include group IV metal compounds which contain at least one cyclopentadienyl ligand.

C. Activation

The above described transition metal catalysts are utilized for olefin polymerization in the presence of a cocatalyst or activator.

Aluminoxanes, especially methyl aluminoxane, are well known cocatalyst for organometallic catalyst compounds.

Methyl aluminoxane, and near variants thereof (which typically contain small levels of higher alkyl groups) are commercially available products. Although the exact structure of these aluminoxanes is still somewhat uncertain, it is generally agreed that they are oligomeric species that contain repeating units of the general formula:

where R is (predominantly) methyl.

It is also well known to employ so-called "ionic activators" (also referred to herein as activator compounds) with organometallic catalyst compounds, as described in U.S. Pat. No. 5,198,401 (Hlatky and Turner) and U.S. Pat. No. 5,132,380 (Stevens and Neithamer). In general, these activators comprise a cation and a substantially non-coordinating anion.

Whilst not wishing to be bound by any theory, it is thought by many of those skilled in the art that boron activators initially cause the abstraction of one or more of the activatable ligands in a manner which ionizes the catalyst into a cation, then provides a bulky, labile, non-coordinating anion which stabilizes the catalyst in a cationic form. The resulting bulky, non-coordinating anion permits olefin polymerization to proceed at the cationic catalyst center (presumably because the non-coordinating anion is sufficiently labile to be displaced by monomer which coordinates to the catalyst. It should be expressly noted that the boron activator/phosphinimine catalyst may also form a non-ionic coordination complex which is catalytically active for olefin polymerization. The boron activator is described as being four coordinate—i.e. there must be four ligands bonded to the boron atom. Preferred boron activators are described in (i)-(ii) below:

(i) compounds of the formula [R5]+[B(R7)4]- wherein B is a boron atom, R5 is an aromatic hydrocarbyl (e.g. triphenyl methyl cation) and each R7 is independently selected from the group consisting of phenyl radicals which are unsubstituted or substituted with from 3 to 5 substituents selected from the group consisting of a fluorine atom, a C1-4 alkyl or alkoxy radical which is unsubstituted or substituted by a fluorine atom; and (ii) compounds of the formula [(R8)t ZH]+[B(R7)4]- wherein B is a boron atom, H is a hydrogen atom, Z is a nitrogen atom or phosphorus atom, t is 2 or 3 and R8 is selected from the group consisting of C1-8 alkyl radicals, a phenyl radical which is unsubstituted or substituted by up to three C1-4 alkyl radicals, or one R8 taken together with the nitrogen atom may form an anilinium radical and R7 is as defined above.

In the above compounds preferably R7 is a pentafluorophenyl radical. In general, preferred boron activators may be described as salts of tetra(perfluorophenyl) boron. More specifically, the preferred activators are anilinium, carbonium, oxonium, phosphonium and sulfonium salts of tetra (perfluorophenyl) boron, with anilinium and trityl (or "triphenyl methylium") salts being especially preferred.

It should also be noted that three coordinate boron activators (i.e. compounds of the formula B(R7)3 where R7 is as defined above) are not suitable for use in the process of this disclosure. This is surprising as such compounds are well known as activators for metallocene catalysts. However, for reasons which are not completely understood, the use of a trivalent boron activator is not suitable for preparing polymers having a broad molecular distribution in accordance with the process of this disclosure.

Exemplary ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium)tetrakispentafluorophenyl borate,
tropillium tetrakis(2,3,5,6-tetrafluorophenyl)borate,
triphenylmethylium tetrakis(2,3,5,6-tetrafluorophenyl)borate,
benzene (diazonium)tetrakis(3,4,5-trifluorophenyl)borate,
tropillium tetrakis(3,4,5-trifluorophenyl)borate,
benzene (diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene (diazonium)tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl)borate, and
benzene (diazonium)tetrakis(2,3,4,5-tetrafluorophenyl)borate.

Readily commercially available ionic activators which are suitable for this disclosure are N,N-dimethylaniliniumtetrakispentafluorophenyl borate, and triphenylmethylium tetrakispentafluorophenyl borate (also known as "trityl borate").

It some cases the boron activator is used in an equimolar amount with respect to the transition metal of the catalyst (i.e. boron/titanium ratio of 1/1, when the catalyst is an organotitanium complex); in other cases mole ratios of from 0.3/1 to 10.0/1 may be used.

B. Description of Dual Reactor Solution Polymerization Process

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The solution polymerization process of this disclosure preferably uses at least two polymerization reactors. The polymer solution exiting from the first reactor is preferably transferred to the second polymerization (i.e. the reactors are most preferably arranged "in series" so that polymerization in the second reactor occurs in the presence of the polymer solution from the first reactor).

The polymerization temperature in the first reactor is from about 80° C. to about 180° C. (in other cases from about 120° C. to 160° C.) and the second reactor is typically operated at a slightly higher temperature. Cold feed (i.e. chilled solvent and/or monomer) may be added to both reactors or to the first reactor only. The polymerization enthalpy heats the reactor. The polymerization solution which exits the reactor may be more than 100° C. hotter than the reactor feed temperature. The reactors are typically well mixed; one example of an agitator system is described in copending and commonly assigned U.S. Pat. No. 6,024,483. Suitable pressures are from about 500 psi to 8,000 psi. The most preferred reaction process is a "medium pressure process", which means that the pressure in each reactor is less than about 6,000 psi (about 42,000 kiloPascals or kPa), and in other cases from about 700 psi to 3,000 psi (about 14,000-22,000 kPa).

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing may be desirable to provide a reaction time for the catalyst components prior to entering the reaction. Such an "in line mixing" technique is described the patent literature (most notably U.S. Pat. No. 5,589,555, issued Dec. 31, 1996 to DuPont Canada Inc.).

The residence time in each reactor will depend on the design and the capacity of the reactor. Generally the reactors should be operated under conditions to achieve a thorough mixing of the reactants. In addition, it is preferred (for dual reactor operations) that from 20 to 60 weight % of the final polymer is polymerized in the first reactor, with the balance being polymerized in the second reactor. As previously noted, the polymerization reactors may be arranged in series (i.e. with the solution from the first reactor being transferred to the second reactor). Alternatively, the reactors may be arranged in parallel (i.e. fresh feeds are supplied to both reactors, a first and second polymer is produced in each reactor and the effluent from the two reactors is subsequently combined). In some embodiments, the first polymerization reactor has a smaller volume than the second polymerization reactor. On leaving the reactor system the solvent is removed and the resulting polymer is finished in a conventional manner.

Further details of the disclosure are illustrated in the following, non-limiting, examples.

The first part illustrates the copolymerization of ethylene and octene-1 in a dual polymerization reactor system using a single site catalyst in both reactors.

The second part illustrates the preparation of the inventive films in a blown film extrusion process.

Test Procedures Used in the Examples are Briefly Described Below

1. Melt Index: "$I_2$", "$I_6$", "$I_{21}$" and Melt Flow Ratio (which is calculated by dividing $I_{21}$ by $I_2$) were determined according to ASTM D1238. [Note: 12 measurements were made with a 2.16 kg weight; $I_6$ uses a 6.48 kg weight; and $I_{21}$ uses a 21.6 kg weight; all tests are done at 190° C.] Test results are reported in units of grams/10 minutes (though these units are often omitted by convention).

2. Stress Exponent ("$S.E_x$") is calculated by $$\frac{\log(I_6/I_2)}{\log(3)}.$$

[Note: Stress Exponent may be regarded as a proxy for molecular weight distribution and/or an existence of long chain branching (i.e. an increase in Stress Exponent value suggests a broadening of molecular weight distribution; or a very dramatic increase of S.Ex. at a similar Mw/Mn may suggest the existence of long chain branching).]

3. Number average molecular weight (Mn), weight average molecular weight (Mw) and polydispersity (calculated by Mw/Mn) were determined by high temperature Gel Permeation Chromatography "GPC" with differential refractive index "DRI" detection using universal calibration.

4. 1% Secant Modulus (MD/TD) was determined according to ASTM D882.

5. Elongation and Yield measurements were determined according to ASTM D882.

6. Tensile measurements were made according to ASTM D882.

7. Tear measurements were made according to ASTM D1922.

8. Density was determined using the displacement method according to ASTM D792.

9. The oven shrink test method measures film shrinkage percentages in both the machine direction (MD) and transverse direction (TD) on one specimen versus the temperature in a convection oven. Films are cut into 4"×4" specimen and the MD and TD directions are identified on the specimen. Each film specimen is placed between sheets of paper. Talcum powder is used on the surface of the paper to prevent sticking of the film specimen to the paper since sticking may restrict the degree of shrinkage. Specimens are placed in an air circulation oven for 10 minutes. Specimens are then removed from the oven and allowed to cool at room temperature for 5 minutes to ensure that total shrinkage has occurred. The dimensions of each specimen are measured in three locations in both the MD and TD directions. The average of the 3 measurements is calculated. The shrink percentage is calculated by subtracting the post-shrink dimension from the "pre-shrink" (original) dimension of the specimen, then dividing that value by the original or pre-shrink specimen dimension. Duplicate specimens are tested at each oven temperature. Testing is performed over a range of oven temperatures to determine the optimum temperature to achieve the greatest shrinkage for each film sample.

10. Puncture strength measurement was determined as follows. An instrumented physical properties testing machine (Instron 4204 Universal Testing Machine)

equipped with 1 kilo Newton load cell and a 1½" (38.1 mm) tapered probe head coated with poly(tetrafluoroethylene) (sold under the trademark TEFLON®) are used. A film sample is clamped beneath the probe head with the probe head and the film liberally coated with a water soluble lubricant. The probe head is then pushed through the sample at a speed of 20"/min (500 mm/min) to the rupture point. The final result is calculated based on the energy at failure normalized to 1 mm film thickness for a minimum of five replicate analyses. The test results are shown in Tables 3 and 4 in the row entitled "Slow Puncture with Teflon" and are expressed in Joules per millimeter.

11. Capillary rheology is determined by a Capillary rheometer at 200° C. The die has a die diameter of 0.06 inch and L/D ratio of 20. $\eta_{10}$ is the shear viscosity at the shear rate of 10 s$^{-1}$ while $\eta_{1000}$ is the shear viscosity at the shear rate of 1000 s$^{-1}$, the term "shear thinning ratio" is obtained by dividing $\eta_{10}$ by $\eta_{1000}$.

12. Rosand melt strength is determined at 190° C. using a Rosand Capillary Rheometer. The die has a diameter of 2 mm and L/D ratio of 10. The melt is extruded at a constant extrusion rate from a barrel through the die at a piston speed of 5.33 mm/min, and the extrudate is pulled at an initial haul-off speed of 2.5 m/min with increasing haul-off speed (at an average acceleration of 54 m/min$^2$) until the strand breaks. The force of drawing the melt is continuously monitored, and the maximum steady value of the force level at or prior to the rupture of the filament is defined as the melt strength.

13. The short chain branch frequency of the copolymers was determined by Fourier Transform Infrared Spectroscopy (FTIR) per ASTM D6645-01 method. Comonomer content can also be measured using $^{13}$C NMR techniques as discussed.

14. Primary melting peak or "$T_m$" (° C.), heat of fusion (J/g) and crystallinity (%) were determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept at 200° C. for five minutes; the melt was then cooled to 0° C. at a cooling rate of 10° C./min and kept at 0° C. for five minutes; the specimen was then heated to 200° C. at a heating rate of 10° C./min. The Tm, heat of fusion and crystallinity are reported from the 2$^{nd}$ heating cycle.

15. To determine CDBI, a solubility distribution curve is first generated for the polyethylene composition. This is accomplished using data acquired from the TREF analysis (described below). This solubility distribution curve is a plot of the weight fraction of the copolymer that is solubilized as a function of temperature. This is converted to a cumulative distribution curve of weight fraction versus comonomer content, from which the CDBI(50) is determined by establishing the weight percentage of a copolymer sample that has a comonomer content within 50% of the median comonomer content on each side of the median (See WO 93/03093 and U.S. Pat. No. 5,376,439).

A description of the temperature rising elution fractionation (TREF) method used herein follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The melt index, $I_2$ and density of the first and second ethylene polymers were estimated by GPC and GPC-FTIR deconvolutions as discussed further below.

High temperature GPC equipped with an online FTIR detector (GPC-FTIR) was used to measure the comonomer content as the function of molecular weight. Mathematical deconvolutions are performed to determine the relative amount of polymer, molecular weight and comonomer content of the component made in each reactor, by assuming that each polymer component follows a Flory's molecular weight distribution function and it has a homogeneous comonomer distribution across the whole molecular weight range.

For these single site catalyzed resins, the GPC data from GPC chromatographs was fit based on Flory's molecular weight distribution function.

To improve the deconvolution accuracy and consistency, as a constraint, the melt index, $I_2$, of the targeted resin was set and the following relationship was satisfied during the deconvolution:

$$\text{Log}_{10}(I_2)=22.326528+0.003467*[\text{Log}_{10}(M_n)]^3-4.322582*\text{Log}_{10}(M_w)-0.180061*[\text{Log}_{10}(M_z)]^2+0.026478*[\text{Log}_{10}(M_z)]^3$$

where the experimentally measured overall melt index of the whole composition, $I_2$, was used on the left side of the equation, while Mn of each component ($M_w=2\times M_n$ and $M_z=1.5\times M_w$ for each component) was adjusted to change the calculated overall $M_n$, $M_w$ and $M_z$ of the composition until the fitting criteria were met. During the deconvolution, the overall $M_n$, $M_w$ and $M_z$ are calculated with the following relationships: $M_n=1/\text{Sum}(w_i/M_n(i))$, $M_w=\text{Sum}(w_i\times M_w(i))$, $M_z=\text{Sum}(w_i\times M_z(i)^2)$, where i represents the i-th component and $w_i$ represents the relative weight fraction of the i-th component in the composition.

The uniform comonomer distribution (which results from the use of a single site catalyst) of the resin components (i.e. the first and second ethylene copolymers) allowed the estimation of the short chain branching content (SCB) from the GPC-FTIR data, in branches per 1000 carbon atoms and calculation of comonomer content (in mol %) and density (in g/cm$^3$) for the first and second ethylene copolymers, based on the deconvoluted relative amounts of first and second ethylene copolymer components in the polyethylene composition, and their estimated resin molecular weight parameters from the above procedure.

A component (or composition) density model and a component (or composition) melt index, $I_2$, model was used according to the following equations to calculate the density and melt index $I_2$ of the first and second ethylene polymers:

$$\text{density}=0.979863-0.00594808*(\text{FTIR SCB}/1000C)^{0.65}-0.000383133*[\text{Log}_{10}(M_n)]^3-0.00000577986*(M_w/M_n)^3+0.00557395*(M_z/M_w)^{0.25};$$

$$\text{Log}_{10}(\text{melt index},I_2)=22.326528+0.003467*[\text{Log}_{10}(M_n)]^3-4.322582*\text{Log}_{10}(M_w)-0.180061*[\text{Log}_{10}(M_z)]^2+0.026478*[\text{Log}_{10}(M_z)]^3$$

where the $M_n$, $M_w$ and $M_z$ were the deconvoluted values of the individual ethylene polymer components, as obtained from the results of the above GPC deconvolutions. Hence, these two models were used to estimate the melt indexes and the densities of the components (i.e. the first and second ethylene copolymers).

EXAMPLES

Part 1

The two blend components of the compositions of this disclosure have different densities, with the requirement that the density difference is from 0.19 to 0.32 g/cc. The compositions of this disclosure may be made in a dual reactor polymerization process in which the low density component is made in one reactor and the high density component is made in the other reactor. The examples illustrate two methods to produce the compositions. In one method, a first catalyst is used in the first reactor and a second (different) catalyst is used in the second reactor. The catalysts differ in their ability to incorporate comonomer. A catalyst that allows larger amounts of comonomer to be incorporated into the polymer will produce a polymer having more short chain branches and a lower density (at a given molecular weight). This method is illustrated for Product 2 (below) in which the catalyst used in the first reactor is better able to incorporate comonomer than the catalyst used in the second reactor.

Another method to produce blend components having different densities is to use the same catalyst in both reactors but use reactor conditions that are different in the two reactors (e.g. use a high octene/ethylene ratio in the first reactor to provide a polymer having a high level of short chain branching and a low density; and a low octene/ethylene ratio in the same reactor to do the opposite). This method is illustrated for Product 1.

The following examples illustrate the continuous solution copolymerization of ethylene and octene at medium pressure in a dual reactor system connected in series. The examples used a first reactor which operated at a lower temperature, relative to the second reactor. The first reactor pressure was about 17,000 kPa (about $2.5 \times 10^3$ psi), and the second reactor pressure was marginally lower (to facilitate flow from the first to second reactor). The contents from this reactor flowed into a larger, second polymerization reactor which operated at a relatively higher temperature (see Table 1). The first reactor had a volume of 12 liters and the second reactor had a volume of 24 liters. Both reactors were agitated to ensure good mixing of the reactor contents. The process was continuous in all feed streams (i.e. solvent, which was methyl pentane; monomers and catalyst and cocatalyst components) and in the removal of product. Monomer and comonomer were purified prior to addition to the reactor using conventional feed preparation systems (such as contact with various absorption media to remove impurities such as water, oxygen and polar contaminants). The catalyst feeds were pumped to the reactors at concentrations and ratios shown in Table 1. Average residence times for the reactors are calculated by dividing average flow rates by reactor volume. The residence time in each reactor for all of the inventive experiments was less than 1.5 minutes and the reactors were well mixed.

The organometallic catalyst used to prepare Product 1 (Table 1) was a titanium (IV) complex having one cyclopentadienyl ligand, two chloride ligands and one tri(tertiary butyl)phosphinimine ligand and is represented by the formula "CpTiNP($^t$Bu)$_3$Cl$_2$". The amount of catalyst fed to each reactor (expressed in parts per million, "ppm" (of titanium) fed to a reactor relative to the total weight of all streams flowing to a reactor) is shown in Table 1.

Two Ti(IV) catalysts were used to prepare Product 2 (Table 1). The catalyst used in the first reactor had a Cp ligand; a tri (isopropyl) phosphinimine ligand and two chloride ligands and is represented by the formula CpTiNP(iPr)$_3$Cl$_2$. This catalyst is less sterically encumbered than the catalyst used to prepare the first product, which allows additional comonomer to be incorporated into the polyethylene resin. The catalyst used in the second reactor (to produce Product 2) was the catalyst from the first example— i.e. CpTiNP(t-Bu)$_3$. As shown in Table 2, the "delta density" (i.e. $d_2$-$d_1$, where $d_1$ is the density of the product from the first reactor and $d_2$ is the density of the product from the second reactor) is greater for product 2 than product 1. As shown in Table 2, the first polyethylene composition (produced in the first reactor) has a first polydispersity (Mw$_1$/Mn$_1$) from about 1.7 to about 3.0; such polydispersities have been measured experimentally as in U.S. Pat. No. 6,777,509; herein incorporated by reference. Similarly, the second polyethylene composition (produced in the second reactor) has a second polydispersity (Mw$_2$/Mn$_2$) of about 1.7 to about 3.0. The z average molecular weights (Mz) of the first (Mz$_1$) and second polyethylene composition (Mz$_2$) are at least 1.5 greater than the respective weight average molecular weight.

The cocatalyst used comprised commercially available alkylaluminoxane and a commercially available ionic activator compound. More specifically, a modified methylaluminoxane (purchased from Akzo-Nobel, under the tradename "MMAO-7") was used in combination with triphenylmethylium tetrakispentafluorophenyl borate "Ph$_3$CB(C$_6$F$_5$)$_4$" (purchased from Asahi Glass) in all experiments. A hindered phenol (2,6-di-tert-butyl-4-ethyl-phenol) "the phenol" was also used.

The amount ratios of alkylaluminoxane and ionic activator fed to each reactor is shown in Tables 2 and 3 and is expressed as the Al/Ti or the B/Ti mole ratio respectively, relative to the titanium contained in the organometallic catalyst.

All of the octene used to prepare the composition was fed to the first reactor.

Product 1 was made with an octene/ethylene weight ratio of 0.38 in reactor 1. Unreacted octene from the first reactor flows to the second reactor. Additional ethylene is added to the second reactor in an amount that is sufficient to maintain the desired operating temperature in R2.

Product 2, which is made with two different catalysts— used a lower octene/ethylene weight ratio (of 0.30) in Reactor 1.

Other reactor conditions are shown in Table 1. The upstream reactor is referred to as R1 and the downstream reactor is referred to as R2. The inlet temperature for the feeds to R1 ("R1 Inlet T") was 30° C. The amount of Ti fed to R1 was 0.080 ppm for the first product. The estimated ethylene conversion in R1 (shown as "R1 Q" in Table 1) was 82% for the first product and 81% for the second product.

Some physical properties of the resulting polyethylene products are shown in Table 2.

TABLE 1

| Reactor Conditions | | | |
|---|---|---|---|
| | | Product 1 | Product 2 |
| R1 Conditions | R1 T (° C.) | 141 | 141 |
| | R1 hydrogen (ppm) | 0.85 | 0.60 |

TABLE 1-continued

Reactor Conditions

| | | Product 1 | Product 2 |
|---|---|---|---|
| | R1 Q (%) | 82 | 81 |
| | R1 Inlet T (° C.) | 30 | 30 |
| | Ti (ppm) to R1 | 0.080 | 0.128 |
| | R1-Al/Ti mole ratio | 100/1 | 60/1 |
| | R1-OH/Al mole ratio | 0.3/1 | 0.5/1 |
| | R1-B/Ti mole ratio | 1.1/1 | 1.1/1 |
| R2 Conditions | R2 T mean (° C.) | 197.0 | 195.6 |
| | R2 NIR-Q (%) | 83 | 83 |
| | R2 hydrogen (ppm) | 7.62 | 9.0 |
| | R2 Inlet T (° C.) | 30 | 30 |
| | Ti (ppm) to R2 | 0.20 | 0.28 |
| | R2 Al/Ti mole ratio | 25/1 | 25/1 |
| | R2 OH/Al mole ratio | 0.3/1 | 0.3/1 |
| | R2 B/Ti mole ratio | 1.2/1 | 1.2/1 |

The data in Table 2 provides additional information about the polyethylene blend composition produced according to the process conditions shown in Table 1. The term W1 refers to the weight fraction of the polyethylene composition that is prepared in R1; W2 refers to the weight fraction produced in R2 (and W2+W1=total weight fraction of the polyethylene composition). The term "SCB" refers to the number of short chain branches, and d1 and d2 refer to density (for the R1 and R2 components, respectively).

TABLE 2

| | Product | |
|---|---|---|
| Resin | Product 1 | Product 2 |
| Density (g/cm$^3$) | 0.9264 | 0.9266 |
| Melt Index $I_2$ (g/10 min) | 0.44 | 0.44 |
| Melt Index $I_{21}$ (g/10 min) | 17.2 | 19.1 |
| Melt Flow ratio ($I_{21}/I_2$) | 39 | 45 |
| Stress Exponent | 1.29 | 1.38 |
| GPC | | |
| Mn | 31,000 | 30,000 |
| Mw | 124,000 | 123,000 |
| Mz | 335000 | 322,000 |
| Polydispersity Index (Mw/Mn) | 4.05 | 4.09 |
| Calculated R1 and R2 Component Characteristics | | |
| R1 | | |
| W1 | 0.44 | 0.46 |
| Mw$_1$ | 228,000 | 220,000 |
| Mw$_1$/Mn$_1$ | 1.7 to 3.0 | 1.7 to 3.0 |
| Melt Index $I_2$ (g/10 min) | 0.04 | 0.04 |
| SCB_1 (per 1000 C atoms) | 7.5 | 9.6 |
| d$_1$ (g/cc) | 0.9143 | 0.9110 |
| R2 | | |
| W2 | 0.56 | 0.54 |
| Mw$_2$ | 34,000 | 32,000 |
| Mw$_2$/Mn$_2$ | 1.7 to 3.0 | 1.7 to 3.0 |
| Melt Index $I_2$ (g/10 min) | 59 | 74 |
| SCB_2 (per 1000 C atoms) | 6.3 | 5.2 |
| d$_2$ (g/cc) | 0.9373 | 0.9402 |
| d$_2$ − d$_1$ | 0.0230 | 0.0292 |

Part 2

This illustrates the preparation of plastic films.
Films were prepared with the polyethylene resins described in Part 1. In addition, a comparative film was prepared from a commercially available polyethylene sold under the trademark ENABLE 27-05 by ExxonMobil Chemical.

The films were prepared on a blown film line manufactured by Gloucester Engineering Corporation of Gloucester, Mass. The blown film line was fitted with a single screw extruder having a 2.5" (6.35 cm) diameter screw, a 24:1 length/diameter screw ratio and an annular die having a 4" (10.16 cm) diameter. The blown film line die gap, die diameter, frost line height, blow up ratio, final film thickness and output rate are shown in Table 4.

Film properties are shown in Table 3.

A review of the data provided in Tables 3, 4 and 5 highlights the following advantages (compared at similar film stiffness) of the inventive resins and their use in shrink films, especially collation shrink films. The present films have a good balance of procesability, dart impact strength, puncture resistance, tear strength, tensile strength at break and shrinkages. The comparative resin is believed to be a long chain branched polyethylene. Nevertheless, the processability (indicated by shear thinning ratio and melt strength in Table 3), physical properties (Table 4) and film shrinkage (Table 5) of the films made from the polyethylenes of this disclosure (Products 1 and 2) are better than or equivalent to those of films made from the comparative resin. For example, the shrinkage data in Table 5 show that Product 1 and Product 2 have high MD shrinkages between about 117° C. and 128° C. The long chain branched comparative resin starts to have at least 65% MD shrinkage at about 121° C., while Products 1 and 2 starts at about 122° C. to 123° C. The comparative resin starts to have a minimum 5% TD shrinkage at about 123° C. while Product 1 starts at about 125° C.

Part 3

The following example illustrates the preparation of collation shrink films using a blend of high pressure low density polyethylene ("LDPE") and the polyethylene blend compositions produced in Part 1 above.

It is known to prepare collation shrink films from 100% LDPE; these films generally good shrink properties but poor physical properties. It is also known to prepare collation shrink films from a blend of LDPE with a linear polyethylene in order to provide films having a balance of shrink and physical properties.

Two such films were prepared from a blend containing 60% LDPE with the balance being "Product 1" (for the first blend) or "Product 2" (for the second blend).

A comparative film was made from a blend containing 60% LDPE and 40% of the above described ENABLE resin.

The LDPE used to prepare all three films was the same and had a melt index, $I_2$, of 0.25 g/10 minutes and a density of 0.920 g/cc.

The films were tested to determine: the minimum temperature (in ° C.) at which a transverse direction (TD) shrinkage of 5% was observed; and the minimum temperature at which a machine direction (MD) shrinkage of 65% was observed.

The comparative film required a temperature of 123° C. to meet the TD shrinkage (versus 113° C. for each of the inventive films) and a temperature of 121° C. to meet the MD shrinkage (versus 115° C. for the film prepared from the blend containing Product 1 and 116° C. for Product 2).

TABLE 3

Product Properties

| Property | Comparative | Product 1 | Product 2 |
|---|---|---|---|
| Density (g/cm$^3$) | 0.9274 | 0.9264 | 0.9266 |
| Melt Index I$_2$ (g/10 min) | 0.47 | 0.44 | 0.44 |
| MFR (I21/I2) | 45 | 39 | 45.1 |
| Stress Exponent | 1.62 | 1.29 | 1.38 |
| Shear thinning ratio $\eta_{10}/\eta_{1000}$ at 200° C. | 11.32 | 19.38 | 18.47 |
| Mean Melt Strength - 190° C. (cN) | 5.39 | 5.32 | 5.54 |
| Branch freq/1000 C | 7.2 | 7.8 | 8.2 |
| CDBI$_{50}$ | 86 | 84.1 | 88 |
| Primary melting Peak (° C.) | 118.7 | 119.3 | 119.4 |
| M$_n$ | 32664 | 31,000 | 30,000 |
| M$_w$ | 98311 | 124,000 | 123,000 |
| M$_z$ | 207849 | 335000 | 322,000 |
| Polydispersity Index (M$_w$/M$_n$) | 3.01 | 4.05 | 4.09 |

TABLE 4

Film Properties #1

| Film Results | Comparative | Product 1 | Product 2 |
|---|---|---|---|
| Key Processing Conditions | | | |
| Film Thickness (micron) | 25.4 | 25.4 | 25.4 |
| Blow Up Ratio | 2.5 | 2.5 | 2.5 |
| Die Gap (mm) | 0.89 | 0.89 | 0.89 |
| Frost Line Height (cm) | 40.6 | 35.6 | 35.6 |
| Die Diameter (mm) | 101.6 | 101.6 | 101.6 |
| Output (lb/h) | 100 | 100 | 100 |
| Film Toughness | | | |
| Dart Impact (g/mil) | 140 | 190 | 248 |
| Max | 157 | 217 | 278 |
| Min | 137 | 167 | 248 |
| Slow Puncture - Lube/Tef (J/mm) | 49 | 64 | 69 |
| Film Tear Resistance | | | |
| Tear MD (g/mil) | 143 | 177 | 197 |
| Tear TD (g/mil) | 653 | 712 | 694 |
| Film Stiffness | | | |
| 2% Sec Modulus - MD(Mpa) | 240 | 238 | 236 |
| 2% Sec Modulus - TD(Mpa) | 267 | 253 | 256 |
| Film Tensile Strength | | | |
| Tensile Break Str - MD(Mpa)-Ave | 51.9 | 67.4 | 46.4 |
| Tensile Break Str - TD(Mpa)-Ave | 34.6 | 42.2 | 34.6 |
| Film Opticals | | | |
| Gloss at 45° | 47 | 20 | 20 |
| Haze (%) | 11.6 | 30.7 | 30.4 |

TABLE 5

Film Properties #2

| Film Results | Comparative | Product 1 | Product 2 |
|---|---|---|---|
| Key Processing Conditions | | | |
| Film Thickness (micron) | 45.7 | 45.7 | 45.7 |
| Blow Up Ratio | 2.5 | 2.5 | 2.5 |
| Die Gap (mm) | 0.89 | 0.89 | 0.89 |
| Frost Line Height (cm) | 40.6 | 35.6 | 35.6 |
| Die Diameter (mm) | 101.6 | 101.6 | 101.6 |
| Output (lb/h) | 100 | 100 | 100 |
| Film Shrinkage % | MD/TD | MD/TD | MD/TD |
| 100° C. | 3/0 | 3/0 | 3/0 |
| 105° C. | 3/0 | 4/0 | 3/0 |
| 110° C. | 5/-1 | 6/-1 | 5/-1 |
| 115° C. | 9/-2 | 9/-2 | 7/-3 |
| 120° C. | 63/-3 | 58/-14 | 54/-11 |
| 125° C. | 85/11 | 81/4 | 77/-2 |
| 130° C. | 80/13 | 80/4 | 80/3 |
| 135° C. | 80/14 | 80/3 | 80/3 |

What is claimed is:

1. A shrink film comprising a polyethylene blend composition having a density of from about 0.920 to about 0.950 g/cc and a melt index, I$_2$, of from about 0.1 to about 0.9 grams per 10 minutes, and a molecular weight distribution Mw/Mn, of from about 2.5 to about 7; wherein said polyethylene blend composition comprises
    1) from about 30 to about 50 weight % of a first polyethylene composition having a first weight average molecular weight, Mw$_1$, of greater than about 140,000, a first molecular weight distribution, Mw$_1$/Mn$_1$, of from about 1.7 to about 3, and a first density d$_1$, and;
    2) from about 70 to about 50 weight % of a second polyethylene composition having a second weight average molecular weight, Mw$_2$, that is greater than about 24,000 and less than said first average molecular weight Mw$_1$; a second molecular weight distribution, Mw$_2$/Mn$_2$, of from about 1.7 to about 3 and a second density d$_2$; with the provisos that 1) said d$_2$ is greater than said d$_1$, and 2) d$_2$-d$_1$, is from about 0.018 g/cc to about 0.032 g/cc, and;
wherein density is measured according to ASTM D792 and melt index is measured according to ASTM D1238 when conducted at 190° C. using a 2.16 kg weight.

2. The shrink film of claim 1 wherein said first polyethylene composition has a first z-average molecular weight, Mz$_1$, of greater than about 250,000.

3. The shrink film of claim 1 wherein said polyethylene blend composition has said molecular weight distribution Mw/Mn, of from about 3 to about 5.5, said density of from about 0.923 to about 0.935 g/cc and said I$_2$ of from about 0.4 to about 0.8 grams/10 minutes.

4. The shrink film of claim 3 wherein said first polyethylene composition has a first z-average molecular weight, Mz$_1$, of greater than about 250,000.

5. A multilayer shrink film having a shrink layer and at least one other layer wherein said shrink layer is prepared from a polyethylene blend composition having a density of from about 0.920 to about 0.950 g/cc and a melt index, I$_2$, of from about 0.1 to about 0.9 grams per 10 minutes, and a molecular weight distribution Mw/Mn, of from about 2.5 to about 7; wherein said polyethylene blend composition comprises
    1) from about 30 to about 50 weight % of a first polyethylene composition having a first weight average molecular weight, Mw$_1$, of greater than about 140,000, a first molecular weight distribution, Mw$_1$/Mn$_1$, of from about 1.7 to about 3, and a first density d$_1$, and;
    2) from about 70 to about 50 weight % of a second polyethylene composition having a second weight average molecular weight, Mw$_2$, that is greater than about 24,000 and less than said first average molecular weight Mw$_1$; a second molecular weight distribution, Mw$_2$/Mn$_2$, of from about 1.7 to about 3 and a second density $d_2$; with the provisos that 1) said $d_2$ is greater than said $d_1$, and 2) $d_2$-$d_1$, is from about 0.018 g/cc to about 0.032 g/cc, and;

wherein density is measured according to ASTM D792 and melt index is measured according to ASTM D1238 when conducted at 190° C. using a 2.16 kg weight.

6. The multilayer shrink film of claim 5 wherein said polyethylene blend composition has said molecular weight distribution Mw/Mn, of from about 3 to about 5.5, said density of from about 0.923 to about 0.935 g/cc and said $I_2$ of from about 0.4 to about 0.8 grams/10 minutes.

7. The multilayer film of claim 6 wherein said first polyethylene composition has a first z-average molecular weight, $Mz_1$, of greater than about 250,000.

8. A shrink wrapped package comprising a collation film comprising a polyethylene blend composition having a density of from about 0.920 to about 0.950 g/cc and a melt index, $I_2$, of from about 0.1 to about 0.9 grams per 10 minutes, and a molecular weight distribution Mw/Mn, of from about 2.5 to about 7; wherein said polyethylene blend composition comprises 1) from about 30 to about 50 weight % of a first polyethylene composition having a first weight average molecular weight, $Mw_1$, of greater than about 140,000, a first molecular weight distribution, $Mw_1/Mn_1$, of from about 1.7 to about 3, and a first density $d_1$, and;

2) from about 70 to about 50 weight % of a second polyethylene composition having a second weight average molecular weight, $Mw_2$, that is greater than about 24,000 and less than said first average molecular weight $Mw_1$; a second molecular weight distribution, $Mw_2/Mn_2$, of from about 1.7 to about 3 and a second density $d_2$; with the provisos that 1) said $d_2$ is greater than said $d_1$, and 2) $d_2$-$d_1$, is from about 0.018 g/cc to about 0.032 g/cc, and;

wherein density is measured according to ASTM D792 and melt index is measured according to ASTM D1238 when conducted at 190° C. using a 2.16 kg weight.

* * * * *